US010290926B2

(12) United States Patent
Jarvis

(10) Patent No.: US 10,290,926 B2
(45) Date of Patent: May 14, 2019

(54) TWO-SHOT KNUCKLES FOR COUPLING ELECTRICALLY ISOLATED SECTIONS OF AN ELECTRONIC DEVICE AND METHODS FOR MAKING THE SAME

(71) Applicant: Apple Inc., Cupertino, CA (US)

(72) Inventor: Daniel William Jarvis, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/678,704

(22) Filed: Aug. 16, 2017

(65) Prior Publication Data

US 2017/0346166 A1 Nov. 30, 2017

Related U.S. Application Data

(63) Continuation of application No. 14/596,689, filed on Mar. 17, 2015, now Pat. No. 9,755,296, which is a (Continued)

(51) Int. Cl.
*H01Q 1/22* (2006.01)
*H01Q 1/24* (2006.01)
(Continued)

(52) U.S. Cl.
CPC ........... *H01Q 1/243* (2013.01); *G06F 1/1626* (2013.01); *G06F 1/1656* (2013.01);
(Continued)

(58) Field of Classification Search
CPC ...... G06F 1/1626; G06F 1/1656; H01Q 1/243
See application file for complete search history.

(56) References Cited

U.S. PATENT DOCUMENTS 4,460,534 A 7/1984 Boehm et al.
5,613,237 A * 3/1997 Bent ............... H04B 1/086
220/4.02

(Continued)

FOREIGN PATENT DOCUMENTS

CN 1135124 11/1996
CN 101585225 11/2009
(Continued)

OTHER PUBLICATIONS

Author Unknown, "Injection Moulding," Wikipedia, 14 pages, Aug. 26, 2011.

*Primary Examiner* — William H. Mayo, III
*Assistant Examiner* — Hiram E Gonzalez
(74) *Attorney, Agent, or Firm* — Brownstein Hyatt Farber Schreck, LLP

(57) ABSTRACT

Two shot knuckles include a first shot component and a second shot component. Both shot components are composed of different dielectric materials, where the first shot is composed of a relatively high strength structural material and the second is composed of a cosmetic material. The first shot component can physically couple two conductive sections together by interfacing with a coupling structure of that section. The first shot component includes second shot retaining regions and a cosmetic region. The second shot component occupies the cosmetic region and anchors itself to the first shot component using the second shot retaining regions. The second shot may be the only part of the two-shot knuckle visible to a user of an electronic device and can exhibit any desired color.

20 Claims, 17 Drawing Sheets

Related U.S. Application Data continuation of application No. 13/251,026, filed on Sep. 30, 2011, now Pat. No. 9,007,748.

(60) Provisional application No. 61/529,728, filed on Aug. 31, 2011.

(51) Int. Cl.
    *G06F 1/16*     (2006.01)
    *H01Q 1/52*     (2006.01)
    *H04M 1/02*     (2006.01)

(52) U.S. Cl.
    CPC ......... *G06F 1/1698* (2013.01); *H01Q 1/2258* (2013.01); *H01Q 1/521* (2013.01); *H04M 1/026* (2013.01); *H04M 1/0249* (2013.01); *H04M 1/0283* (2013.01)

(56) References Cited

U.S. PATENT DOCUMENTS

| | | | |
|---|---|---|---|
| 7,089,571 B2 | 8/2006 | Volk et al. | |
| 7,440,285 B2 | 10/2008 | Centofante | |
| 7,595,759 B2 | 9/2009 | Schlub et al. | |
| 7,805,172 B2 | 9/2010 | Joo | |
| 8,322,560 B2 | 12/2012 | Jiang et al. | |
| 8,738,104 B2 | 5/2014 | Yeates | |
| 8,913,395 B2 | 12/2014 | Myers et al. | |
| 8,947,303 B2 | 2/2015 | Golko et al. | |
| 2009/0017263 A1* | 1/2009 | Yeates | B22D 19/04 428/167 |
| 2009/0066588 A1 | 3/2009 | Chen et al. | |
| 2009/0256758 A1 | 10/2009 | Schlub et al. | |
| 2010/0048257 A1 | 2/2010 | Prest et al. | |
| 2010/0214180 A1 | 8/2010 | Krogerus et al. | |
| 2011/0080333 A1* | 4/2011 | Wu | H01Q 1/243 343/906 |
| 2011/0186325 A1 | 8/2011 | Myers et al. | |
| 2011/0188178 A1 | 8/2011 | Prest et al. | |

FOREIGN PATENT DOCUMENTS

| | | |
|---|---|---|
| CN | 101601335 | 12/2009 |
| CN | 102076189 | 5/2011 |
| JP | 2004517577 | 6/2004 |
| JP | 2008288801 | 11/2008 |
| TW | 201127595 | 8/2011 |
| WO | WO2011/096960 | 8/2011 |

\* cited by examiner

TWO-SHOT KNUCKLES FOR COUPLING ELECTRICALLY ISOLATED SECTIONS OF AN ELECTRONIC DEVICE AND METHODS FOR MAKING THE SAME

This application is a continuation patent application of U.S. patent application Ser. No. 14/659,689, filed Mar. 17, 2015 and titled "Two-Shot Knuckles for Coupling Electrically Isolated Sections of an Electronic Device and Methods for Making the Same," which is a continuation patent application of U.S. patent application Ser. No. 13/251,026, filed Sep. 30, 2011 and titled "Two-Shot Knuckles for Coupling Electrically Isolated Sections of an Electronic Device and Methods for Making the Same," now U.S. Pat. No. 9,007,748, which claims the benefit of U.S. Provisional Patent Application No. 61/529,728, filed Aug. 31, 2011 and titled "Two-Shot Knuckles for Coupling Electrically Isolated Sections of an Electronic Device and Methods for Making the Same," the disclosures of which are hereby incorporated herein by reference in their entireties.

FIELD OF THE INVENTION

Systems and methods are disclosed for coupling sections of an electronic device. In particular, components of an electronic device can be assembled from two or more sections, where these sections may be coupled together using two-shot knuckles.

BACKGROUND OF THE DISCLOSURE

A portable electronic device can be constructed using different approaches. In some cases, an electronic device can be constructed by assembling several components together. These "components" can include external components that are combined to form a device enclosure (e.g., a device "housing"), as well as internal components that may provide structural support or other functionality for the electronic device (e.g., the internal component could be a microchip). Based on the design of the electronic device, the components can be formed from any suitable material(s) such as metals, plastics, or any other materials.

In some cases, the various components of the electronic device can operate as part of an electrical circuit. For example, a particular component could serve as a resistor or as a capacitor to another part of the electronic device. As another example, a component can function as part of an antenna assembly of the electronic device. If the component is used in only a single electrical circuit, then the component may be constructed from a single piece of conductive material. If the same component, however, is used in several different electrical circuits, the component may need to be constructed from several "sections" of conductive elements. In this case, however, it may be necessary to separate each of the conductive sections with an insulating or other non-conductive material, in order to ensure that each section operates in its own electrical circuit correctly. In some cases, it may be desirable for this insulating material to exhibit desired cosmetic properties as well as perform its functional duties of coupling the sections together and electrically isolating them.

SUMMARY OF THE DISCLOSURE

Two-shot knuckles for coupling electrically isolated conductive sections of an electronic device and methods for making the same are provided. In some embodiments, an electronic device can be formed from several components, such as an outer periphery component and/or other components. The outer periphery component may provide a housing structure for the electronic device by encircling the electronic device. In some cases, this outer periphery component can be assembled from two or more "sections." Knuckles may then be used to couple these sections together.

The shape and structure of the knuckles can be based on various design considerations. Two shot knuckles include a first shot component and a second shot component. Both shot components are composed of different dielectric materials, where the first shot is composed of a relatively high strength structural material and the second is composed of a cosmetic material. The first shot component can physically couple two conductive sections together by interfacing with a coupling structure of each section. The first shot component includes second shot retaining regions and a cosmetic region. The second shot component occupies the cosmetic region and anchors itself to the first shot component using the second shot retaining regions. The second shot may be the only part of the two-shot knuckle visible to a user of an electronic device and can exhibit any desired color.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION OF THE DISCLOSURE

An electronic device can include several components assembled together to form internal and/or external features of the electronic device. For example, one or more internal components (e.g., electrical circuitry and/or internal support structures) can be placed within external components (e.g., housing structures) to provide an electronic device having desired functionality. As used herein, the term "component" refers to a distinct entity of an electronic device, such as a particular electronic circuit (e.g., a microchip), a member forming the housing of the electronic device (e.g., a backplate, an outer periphery component, and the like), an internal support structure (e.g., a mid-plate), and the like.

In some cases, a component can be manufactured by assembling and connecting two or more different individual elements (i.e., "sections") together. As used herein, the term "section" refers to an individual portion of a component, where that component may be formed from multiple sections. The various sections of the component may then be coupled together using a "knuckle." Based on the desired functionality and design of the component and its sections, these knuckles can exhibit a wide range of shapes and structures. For example, the knuckles can include structural designs that reinforce the knuckle at areas of high mechanical strain, that counteract twisting movements at areas of high torsion, that interlock two sections together such that they are mechanically coupled together, that provide electrical isolation between the sections, and the like.

Figure 1:
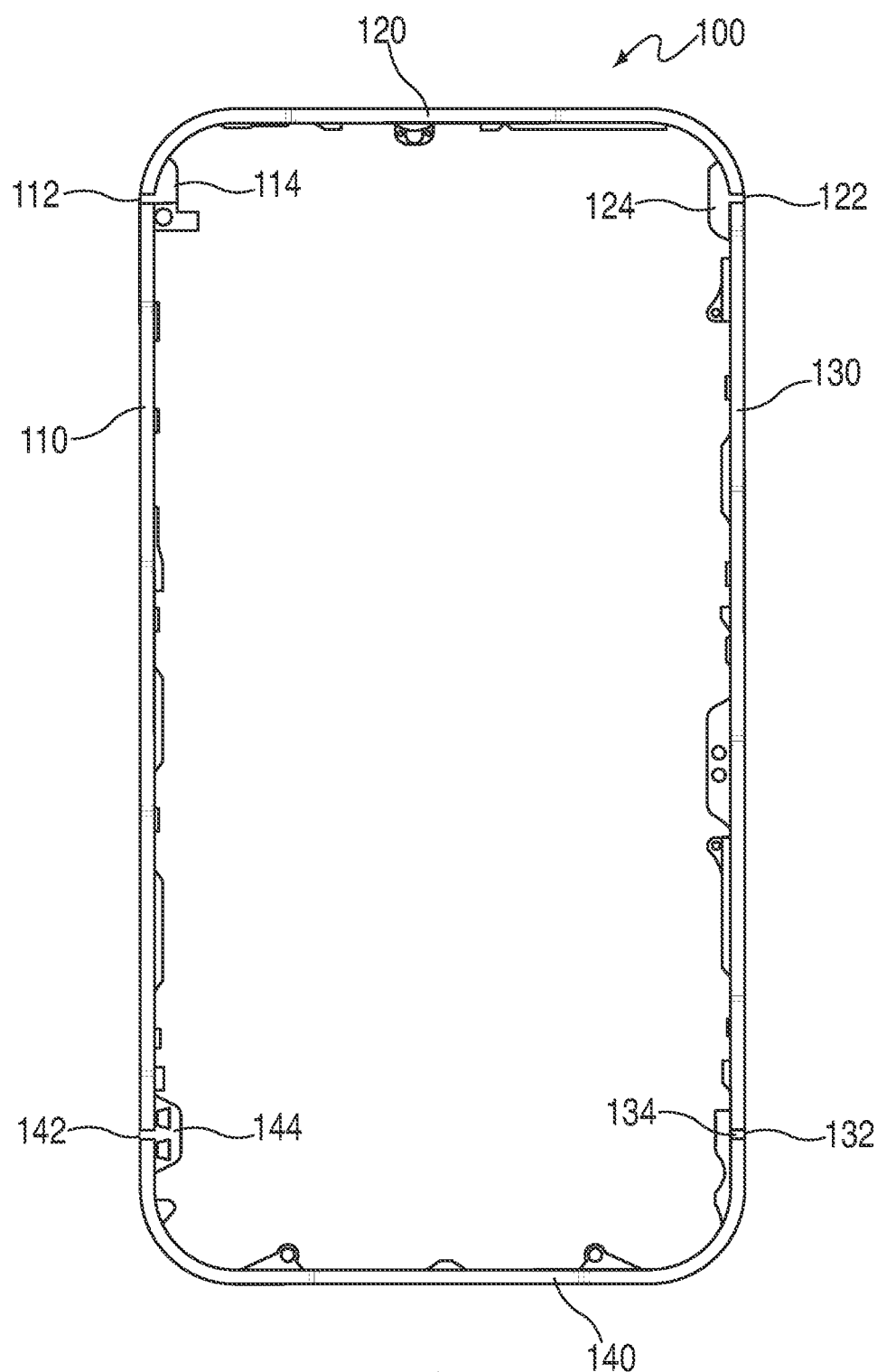
FIG. 1 shows a schematic view of an illustrative component of an electronic device in accordance with some embodiments of the present invention.
Figure 2A:
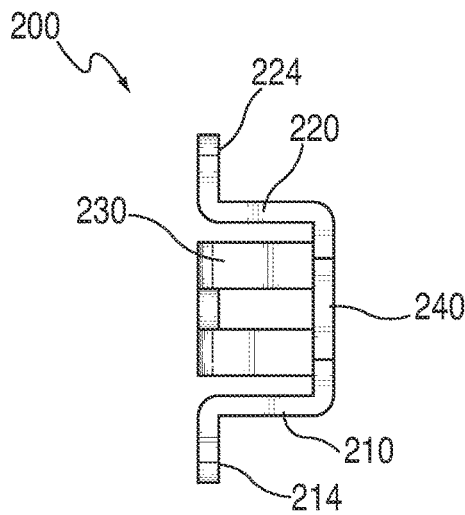
FIGS. 2A-G show several views of an illustrative bracket in accordance with some embodiments of the invention.
Figure 2B:
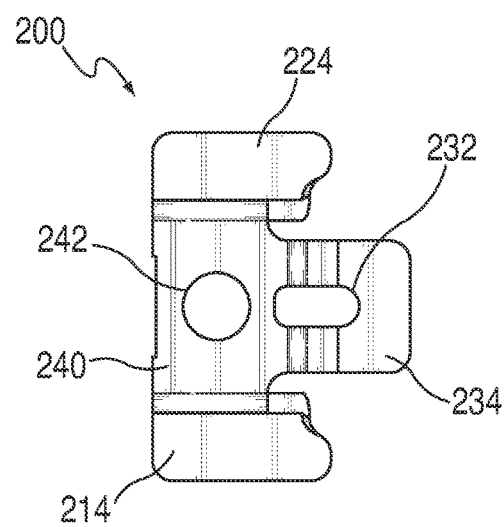
Figure 2C:
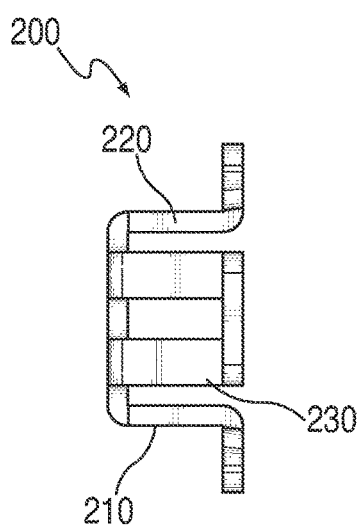
Figure 2D:
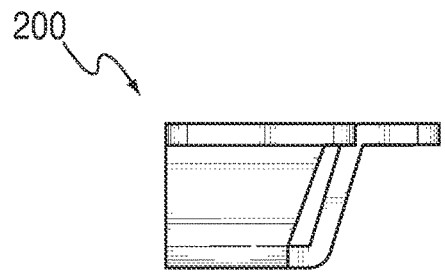
Figure 2E:
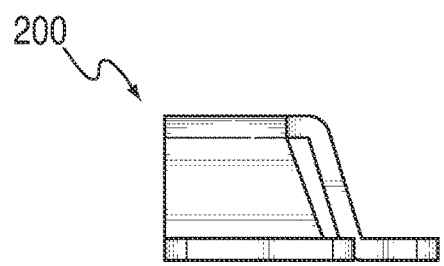
Figure 2F:
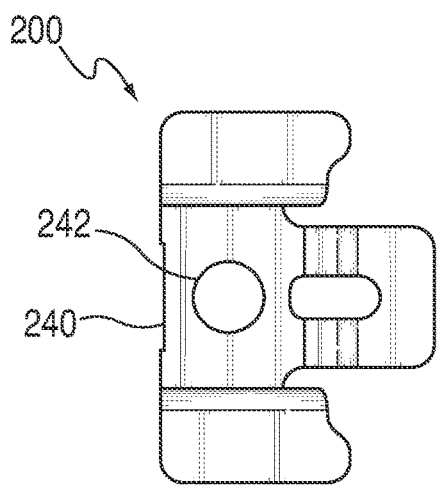
Figure 2G:
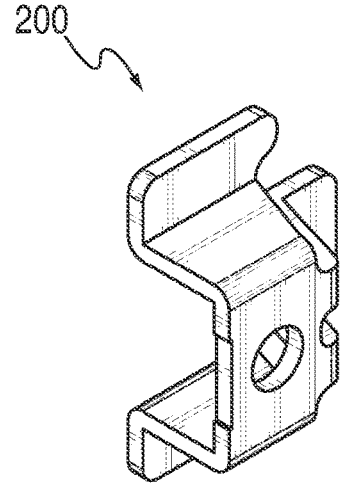
Figure 2H:
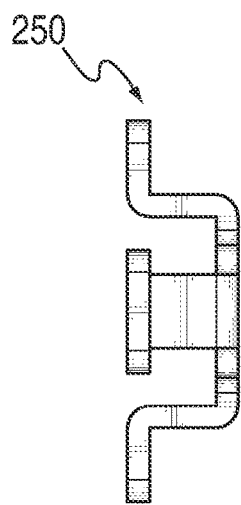
FIGS. 2H-2N show several views of another illustrative bracket in accordance with some embodiments of the invention.
Figure 2I:
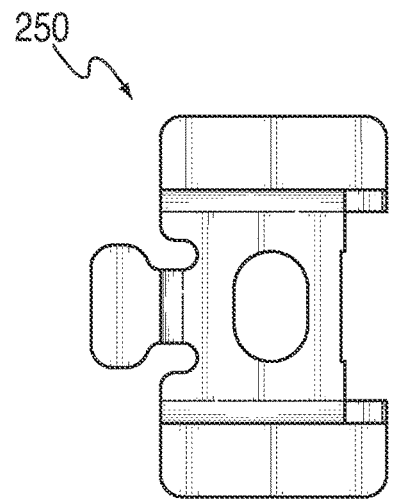
Figure 2J:
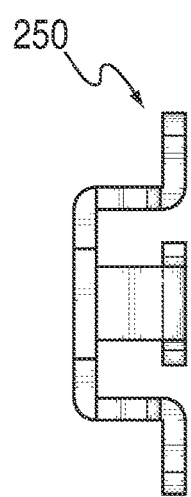
Figure 2K:
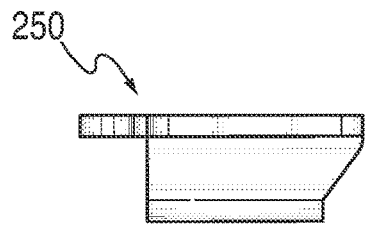
Figure 2L:
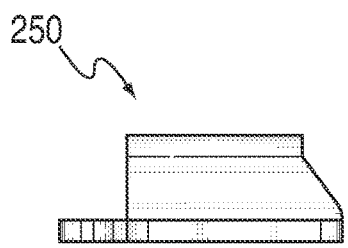
Figure 2M:
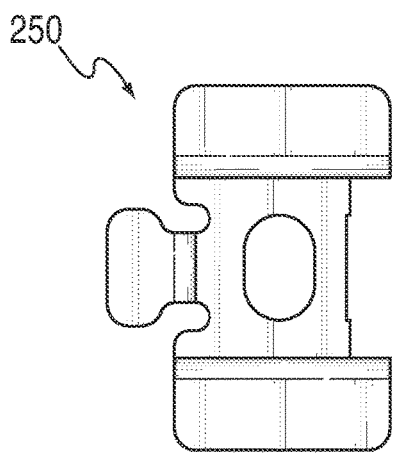
Figure 2N:
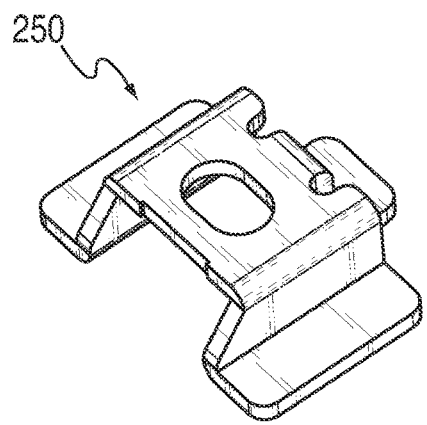

FIG. 1 shows a schematic view of an illustrative component of an electronic device in accordance with some embodiments of the present invention. In particular, FIG. 1 shows outer periphery component 100 that can be constructed by connecting several sections together, such as sections 110, 120, 130, and 140. Outer periphery component 100 can be constructed to form an exterior, periphery surface for an electronic device. In particular, outer periphery component 100 can surround or wrap around some or all of the internal components (e.g., electronic circuits, internal support structures, and the like) of the electronic device. In other words, outer periphery component 100 can define an internal volume into which internal components can be placed.

The thickness, length, height, and cross-section of outer periphery component 100 can be selected based on any suitable criteria including, for example, based on structural requirements (e.g., stiffness or resistance to bending, compression, tension or torsion in particular orientations). In some embodiments, outer periphery component 100 can serve as a structural member to which other electronic device components can be mounted. Some of the structural integrity of outer periphery component 100 can come from the closed shape that it defines (e.g., outer periphery component 100 forms a loop, thus providing structural integrity).

Outer periphery component 100 can have any suitably shaped cross-section. For example, outer periphery component 100 can have a substantially rectangular cross-section. Each corner of the substantially rectangular cross-section can be rounded in shape, thus forming a "spline." As used herein, the term "spline" refers to a rounded corner portion of an outer periphery component. In some embodiments, outer periphery component 100 can have a cross-section in any other suitable shape including, for example, a circular shape, an oval shape, a polygonal shape, or a curved shape. In some embodiments, the shape or size of the cross-section of outer periphery component 100 can vary along the length or width of the electronic device (e.g., an hourglass shaped cross-section).

Outer periphery component 100 of the electronic device can be constructed using any suitable process. In some embodiments, outer periphery component 100 can be constructed by connecting section 110 and section 120 together at interface 112, connecting section 120 and section 130 together at interface 122, connecting section 130 and section 140 together at interface 132, and connecting section 140 and section 110 together at interface 142. Although outer periphery component 100 is illustrated in FIG. 1 as being constructed from four sections, one skilled in the art could appreciate that outer periphery component 100 could alternatively be formed from any suitable number of two or more sections, and that the interfaces between the sections may be positioned at any location on outer periphery component 100.

Each section 110, 120, 130, and 140 can be constructed individually and later assembled to form outer periphery component 100. For example, each section can be individually constructed using one or more of stamping, machining, working, casting, or any combinations of these. In some embodiments, the materials selected for sections 110, 120, 130, and 140 can be conductive, thus allowing the sections to provide an electrical functionality for the electronic device. For example, sections 110, 120, 130 and/or 140 can be formed from a conductive material such as stainless steel or aluminum. In some embodiments, each section may serve as an antenna for the electronic device.

To mechanically couple individual sections together, knuckles 114, 124, 134, and 144 can exist at interfaces 112, 122, 132, and 134 respectively. In some embodiments, each of the knuckles can be constructed from a material that can begin in a first state and may subsequently change to a second state. As an illustration, the knuckles can be constructed from a plastic that begins in a first, liquid state and then subsequently changes to a second, solid state. While in the liquid state, the plastic can be allowed to flow into interfaces 112, 122, 132, and 142. After flowing into these interfaces, the plastic material may subsequently be allowed to harden into knuckles 114, 124, 134, and 144 (e.g., the plastic material is allowed to change into the second, solid state). Upon changing into the solid state, the plastic material may then bond together sections 110 and 120, 120 and 130, and 140 and 110, respectively, thus forming a single new component (e.g., outer periphery component 100). In one embodiment, knuckle 134 may be cosmetic and not physically couple sections 130 and 140 together. In this embodiment, sections 130 and 140 can be welded together so that they are physically and electrically coupled. In another embodiment, knuckle may physically couple sections 130 and 140 together in accordance with principles of the invention.

Knuckles 114, 124, and 144 not only physically couple together sections 110 and 120, 120 and 130, and 140 and 110, respectively, they electrically isolate section 110 from section 120, section 120 from section 130, and section 140 from section 110. For purposes of this discussion, assume sections 130 and 140 are electrically the same because they are welded together, and that knuckle 134 is cosmetic. As will be explained in more detail below, knuckles 114, 124, and 144 encapsulate and/or exist with coupling structures that are attached to or integrally formed parts of sections 110, 120, 130, and 140. That is, when the knuckle in its first state (e.g., the liquid state), it flows into and/or around the coupling structures. A shutoff device (not shown) may be positioned at each interface to shape the knuckle for when it transforms into its second state (e.g., the solid state). As shown in FIG. 1, knuckles 114 and 124 are asymmetric in shape and knuckle 144 is symmetric in shape.

The coupling structures (not shown) exist on sections 110, 120, 130, and 140. Some sections (e.g., sections 110 and 120) may have two coupling structures whereas other sections (e.g., sections 130 and 140) have one coupling structure for interfacing with a knuckle. In some embodiments, the coupling structure can be a bracket such as that shown, for example, in FIG. 2. The bracket can be attached or welded to an inside surface of a section. In another embodiment, the coupling structure can be an integrally formed part of the section that was originally part of the section. In FIG. 1, knuckle 114 interfaces with a bracket and an integrally formed coupling structure and knuckles 124 and 144 interface with two brackets.

Any suitable process can be used to place the knuckle material into interfaces 112, 122, 132, and 142, and any suitable process can be used to change the knuckle material from the first state to the second state. In some embodiments, a "molding process" can be used in which the knuckle material is initially inserted in a liquid state and then is subsequently hardened. For example, one or more of injection molding, compression molding, transfer molding, extrusion molding, blow molding, thermoforming, vacuum forming, or rotomolding processes can be used. In this case, a "one shot" process can be used in which the knuckle material is inserted in a single step, and then independently changes to its second state. In other words, the knuckle can be formed in a single step (e.g., in "one shot") without necessitating additional steps or manufacturing processes.

The knuckle material may be any material suitable for mechanically coupling two sections together and electrically isolate the two section. The knuckle material may be a plastic such as a thermal plastic. In one embodiment, the knuckle material may be a glass filled nylon.

FIGS. 2A-G show several views of an illustrative bracket 200 in accordance with an embodiment of the invention that can be mounted to one of the sections. In particular, FIGS. 2A-G show back, top, front, left, right, bottom, and isometric views respectively of bracket 200. Bracket 200 can include three legs 210, 220, and 230, which extend from planar member 240. Legs 210 and 220 may both extend away from planar member 240 at a right angle (e.g., 90 degrees), whereas leg 230 may extend away from leg 230 at angle between 1 and 90 degrees. Leg 230 can have slot 232 to promote flow of knuckle material when it is in its first state. In addition, plate 240 can have through-hole 242 or a cutout of any suitable shape to promote flow of knuckle material when in its first state. Legs 210, 220, and 230 may have feet 214, 224, and 234, respectively, for being welded to a surface of one of the sections.

Bracket 200 can be constructed from any suitable material. In some embodiments, bracket 200 is constructed from a conductive material such as metal (e.g., steel or aluminum). In some embodiments, bracket 200 is constructed from the same material as the section it is being welded to. For example, bracket 200 and the section it is being welded to can both be constructed from stainless steel.

It is understood that brackets of any suitable construction can be used in connection with the sections. For example, FIGS. 2H-2N shows several views of bracket 250 constructed in accordance with an embodiment of the invention. Bracket 250 is similar in many respects to bracket 200 as it includes legs and welding feet, as well as a cutout for promoting knuckle material flow.

Figure 3A:
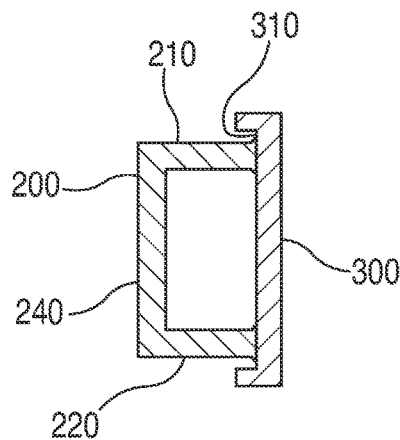
FIGS. 3A and 3B show illustrative views of a bracket welded to a section in accordance with some embodiments of the invention.
Figure 3B:
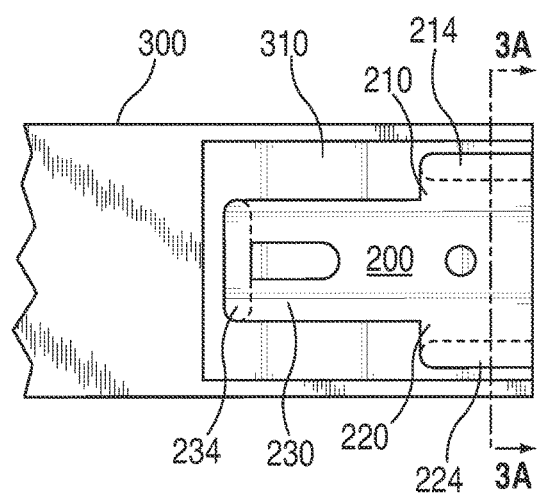

Referring now to FIGS. 3A and 3B, illustrative views of bracket 200 welded to section 300 are shown. In particular, FIG. 3A shows an illustrative cross-sectional view and FIG. 3B shows an illustrative top view. Bracket 200 is shown sitting within recess 310 of section 300. Recess 310 may have been machined out of section 300 during or after manufacture of section 300. Recess 310 may serve as a vessel for retaining a portion of a knuckle as it transitions from its first to second state. As shown, feet 214, 224, and 234 are welded to recess 310. This weld physically anchors bracket 200 to section 300 and electrically couples bracket to section 300.

Figure 4:
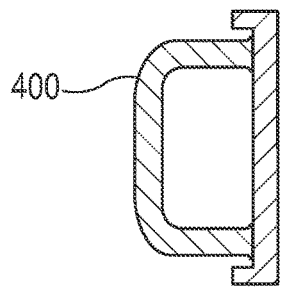
FIG. 4 shows an illustrative view of another bracket welded to a section in accordance with some embodiments of the invention.

The edge of bracket 200 aligns with the edge of section 300. This alignment may be a product of a cutting operation that physically cuts away a portion of bracket 200 and section 300. It is the total cross-sectional area of the aligned edges of bracket 200 and section 300 that control capacitance of the knuckle coupling two sections together. Smaller cross-sections generally result in less capacitance. In embodiments where the section is used as an antenna, lower capacitance enhances antenna performance. The cross-sectional area can be varied, for example, by increasing the thickness of bracket 200 or using a bracket that has a different cross-sectional shape. See FIG. 4 as an example of another bracket 400 having a different cross-sectional shape.

Figure 5B:
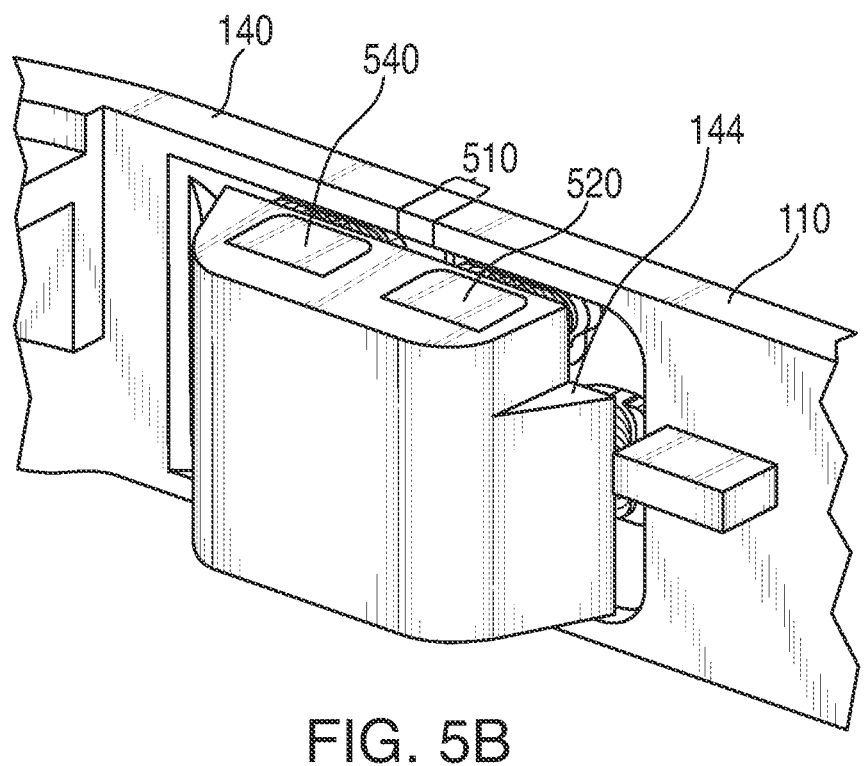
FIGS. 5A and 5B show various views of a particular knuckle design in accordance with one embodiment of the invention.
Figure 5A:
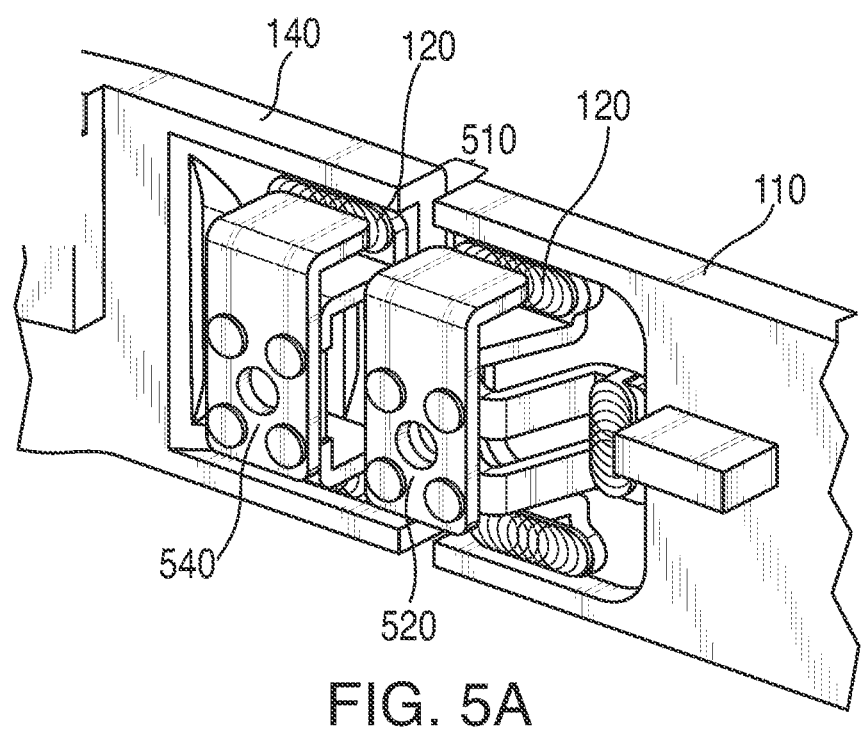

FIG. 5A shows an illustrative enlarged perspective view of sections 110 and 140 (of FIG. 1) having respective brackets 200 welded thereto in accordance with an embodiment of the invention. FIG. 5A also shows contact members 520 and 540 welded to top of the planar member of each bracket 200. Contact members 520 and 540 have a cutout that mimics cutout 242 of bracket 200 and that promotes flow of knuckle material when it is in its first state. A portion of contact members 520 and 540 will be left exposed after the knuckle material encapsulates brackets 200 and members 520 and 540. The exposed portion may provide a solder pad for connecting a conductor (e.g., an antenna conductor) so that it is electrically coupled to one of sections 120 or 140.

Gap 510 exists between the side walls of sections 110 and 140. Gap 510 may have a predetermined distance that is maintained between the side walls and brackets 200 during application of the knuckle material. When the material is applied, it can flow in and around brackets 200, members 520 and 540, and fill the recesses in which brackets 200 sit. After the material cures, resulting knuckle 144 (FIG. 5B) is provided.

FIG. 5B shows a perspective view of knuckle 144 in accordance with an embodiment of the invention. As shown, knuckle 144 physically couples sections 110 and 140 together but ensures they are electrically isolated by the distance of gap 510. Portions of contact members 520 and 540 are exposed even though knuckle 144 is cured. It is understood that contact members 520 and 540 are optional and are not necessary for each knuckle. For example, knuckle 124 may not encapsulate any contact members.

Figure 6A:
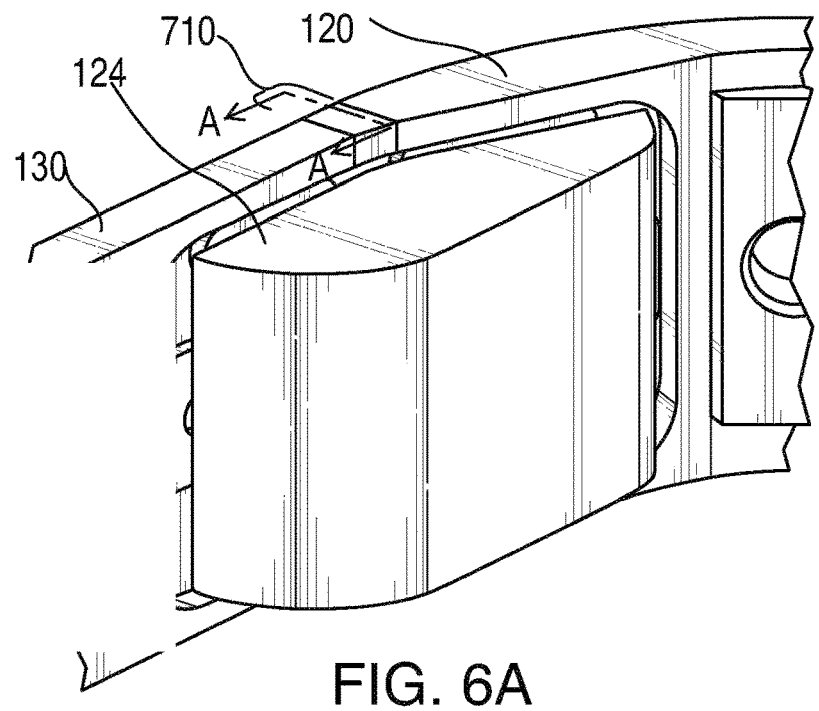
FIGS. 6A-6C show various schematic views of another particular knuckle design in accordance with one embodiment of the invention.
Figure 6B:
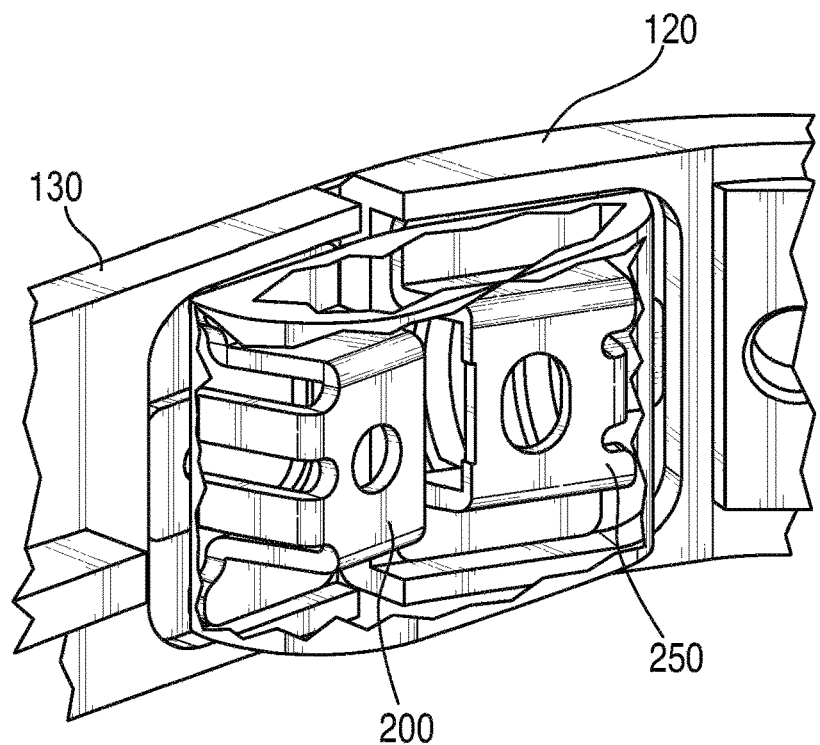
Figure 6C:
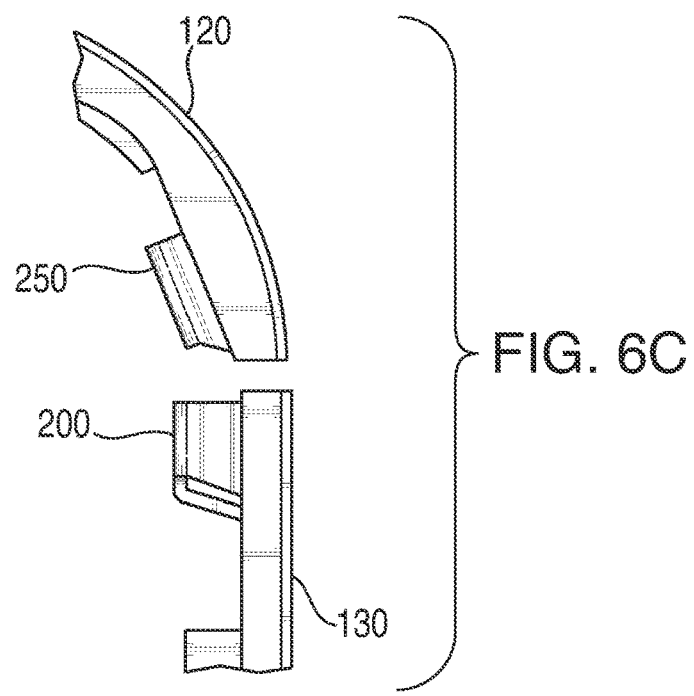

FIG. 6A shows a perspective view of knuckle 124 of FIG. 1 in accordance with an embodiment of the invention. Knuckle 124 can encapsulate two brackets (not shown) and mechanically couple sections 130 and 120 together, and ensures they are electrically isolated by gap 710. FIGS. 6B and 6C show a perspective view and a top view, respectively, of brackets 200 and 250 mounted to sections 120 and 130, respectively. Bracket 250 is dimensioned a little smaller than its counterpart bracket 200 and thus may be better suited for being mounted in curved sections, such as section 120.

Figure 7:
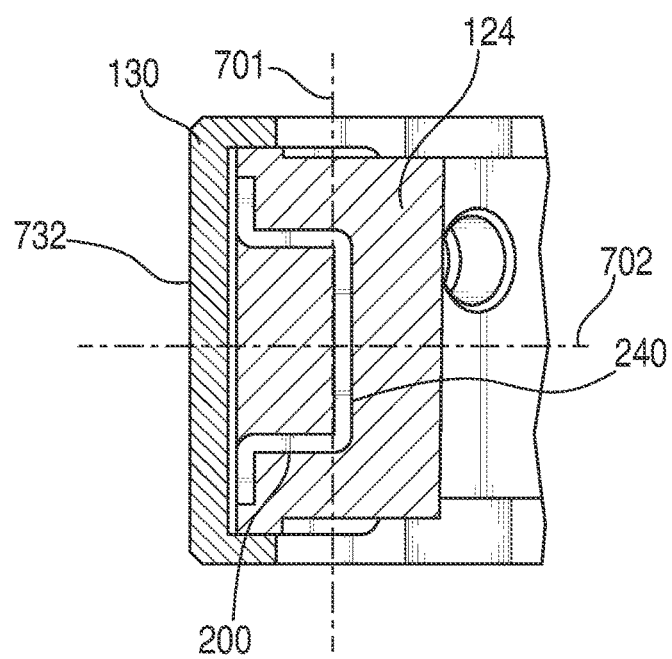
FIG. 7 shows a cross-sectional view of the knuckle of FIG. 6A in accordance with one embodiment of the invention.

FIG. 7 shows a cross-sectional view taken along line A-A of FIG. 6A. The cross-sectional view shows side wall 732 of section 130, knuckle 124, and bracket 200. Also shown is vertical center axis 701 which is aligned with plate member 240. Horizontal center axis 702 is also shown to bisect plate member 240. Equal thicknesses of knuckle 124 exist on both sides of center axes 701 and 702. This ensures knuckle 124 is even distributed about the bracket and provides optimal mechanical coupling strength.

Figure 8A:
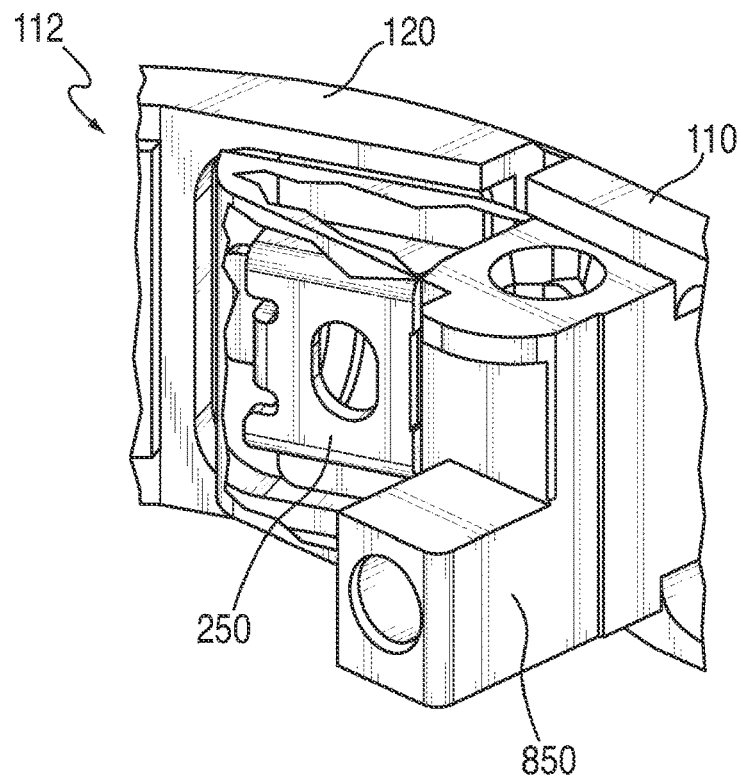
FIGS. 8A-8C show various schematic views of yet another particular knuckle design in accordance with one embodiment of the invention.
Figure 8B:
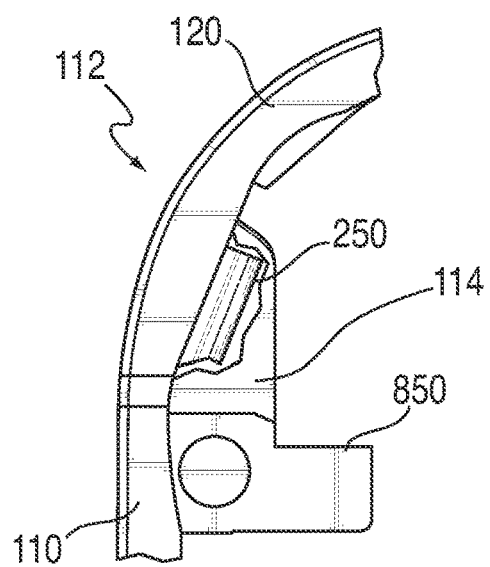
Figure 8C:
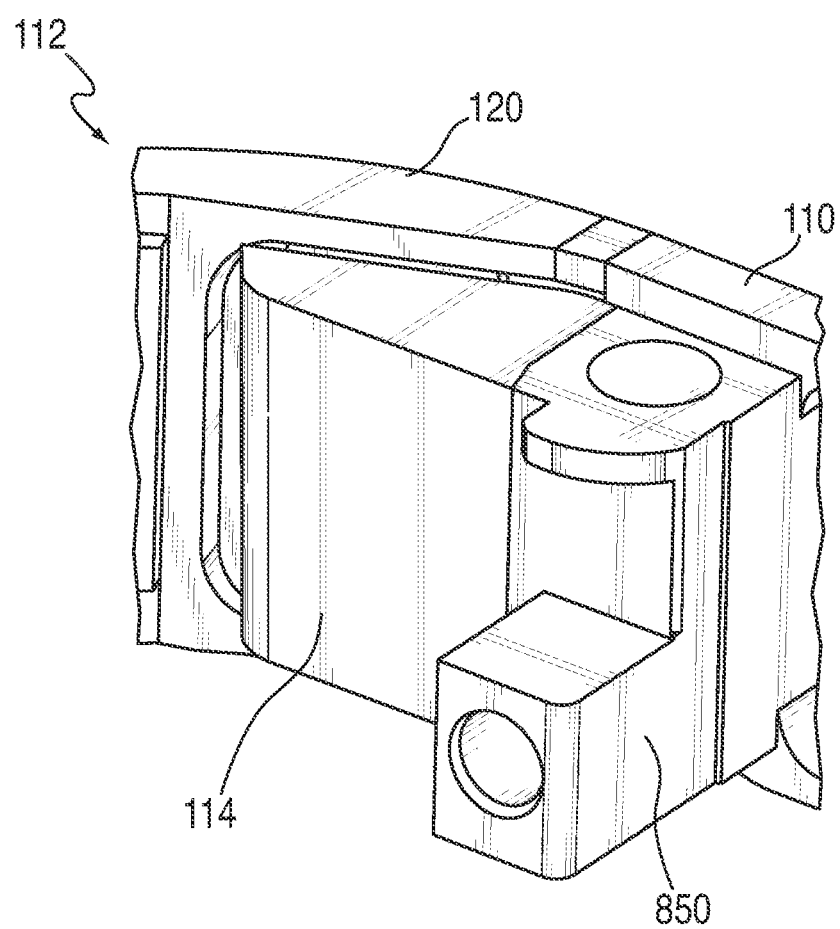

FIGS. 8A-C show various illustrative views of interface 112 in accordance with embodiments of the invention. FIG. 8A shows bracket 250 mounted to section 120 and it also shows integrated coupling structure 850. FIGS. 8B and 8C show knuckle 114 interfacing with bracket 250 and coupling structure 850.

Figure 9:
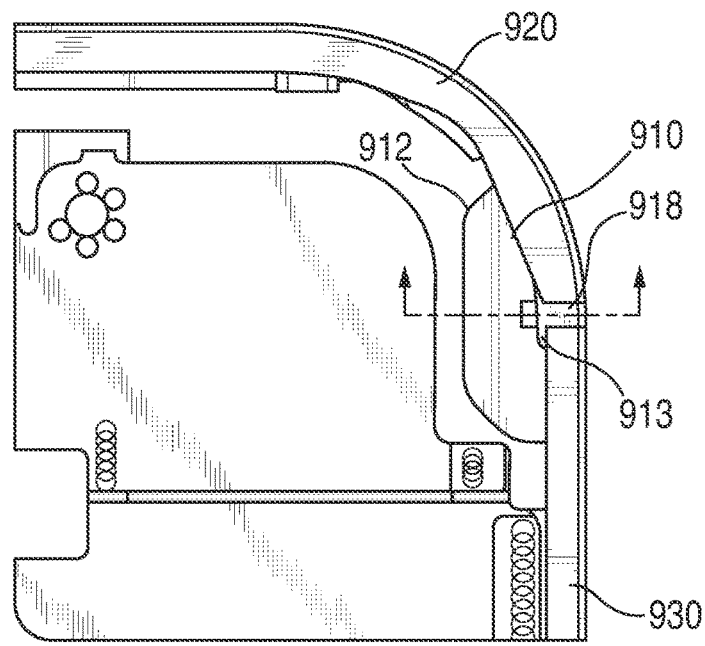
FIG. 9 shows a two-shot knuckle according to some embodiments of the invention.

FIG. 9 shows a two-shot knuckle according to an embodiment of the invention. As shown, two-shot knuckle 910 mechanically couples together sections 920 and 930. Sections 920 and 930 can be any suitable conductive section each having a coupling structure (e.g., a bracket welded thereto or an integrally formed structure). For example, sections 920 and 930 can each have a bracket welded thereto. As another example, section 920 can have a bracket welded thereto and section 930 can have an integrally formed structure. In yet another example, both sections 920 and 930 can have integrally formed structures.

Two-shot knuckle 910 includes first shot component 912 and second shot component 918. First shot component 912 physically couples sections 920 and 930 together. That is, first shot 912 provides the mechanical coupling since it encapsulates both coupling structures similar to that as discussed above in connection with FIGS. 5-8. In addition, it is constructed from a material that is better suited for coupling sections 920 and 930 than second shot component 918. For example, first shot material 912 may be constructed from a glass-filled nylon and second shot material may be constructed from an unfilled nylon. Both first and second shots 912 and 918 electrically isolate sections 920 and 930 from each other.

Second shot 918 resides in a second shot retaining region 913 and within the gap existing between sections 920 and 930. Since second shot 918 resides in the gap, it is the part visible to a user when an electronic device using knuckle 910 and sections 920 and 930 is fully assembled. As such, second shot 918 serves as a cosmetic component and can be constructed from a material having any suitable color. For example, second shot 918 can be white, blue, purple, red, green, orange, yellow, or gray.

Figure 10:
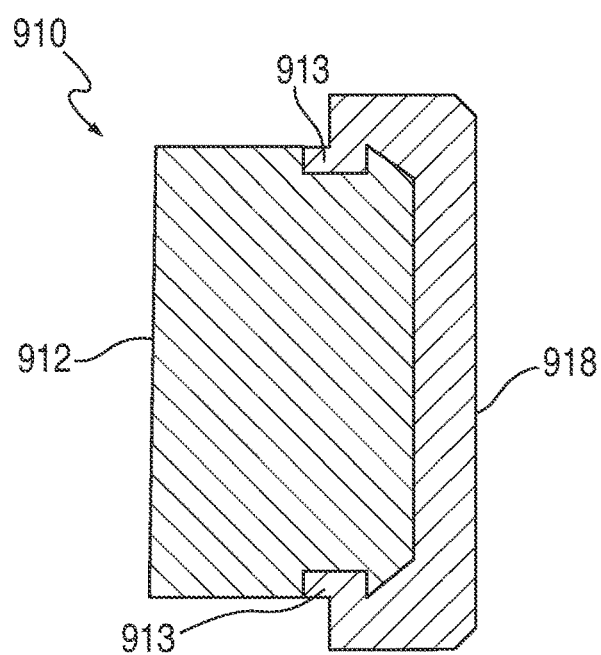
FIG. 10 shows a cross-sectional view of the knuckle of FIG. 9 taken along line A-A in accordance with an embodiment of the invention.

FIG. 10 shows a cross-sectional view of knuckle 910 taken along line A-A of FIG. 9 in accordance with an embodiment of the invention. FIG. 10 shows first shot component 912 having second shot retaining regions 913. Second shot retaining regions 913 can be cavities formed in component 912 during the first shot molding process. These cavities serve as coupling mechanisms that enable second shot component 918 to anchor itself to first shot component 912. In some embodiments, second shot component 918 may be constructed from a material that is unable to chemically bond to first shot material 912 after it cures. This may be because it is undesirable to remelt any portion of first shot 912 after it has cured. Thus, by leveraging second shot retaining regions 913, second shot 918 anchors itself to first shot 912 when it cures.

FIGS. 11A-B through 14A-B show illustrative views of a series of process steps used to manufacture a two-shot knuckle in accordance with an embodiment of the invention. The figures ending with the letter A show a top view and figures ending with the letter B show a cross-sectional view. The two-shot knuckle can be knuckle 910 of FIG. 9, though it is understood that any other suitable knuckle can be created.

Figure 11A:
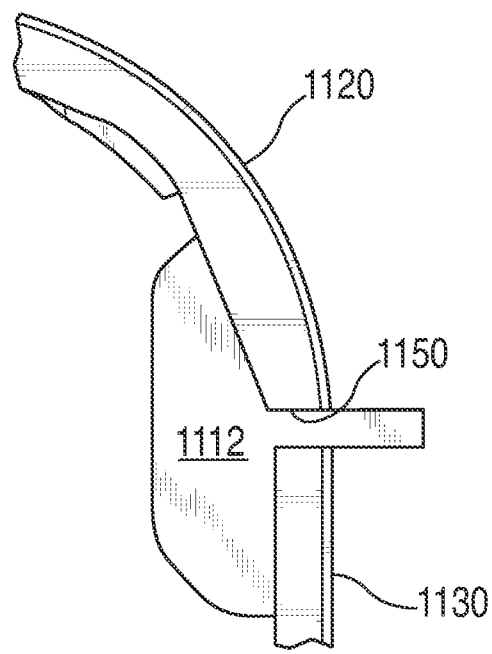
FIGS. 11A-B, 12A-B, 13A-B, and 14A-B show illustrative views of a series of process steps used to manufacture a two-shot knuckle in accordance with some embodiments of the invention.
Figure 11B:
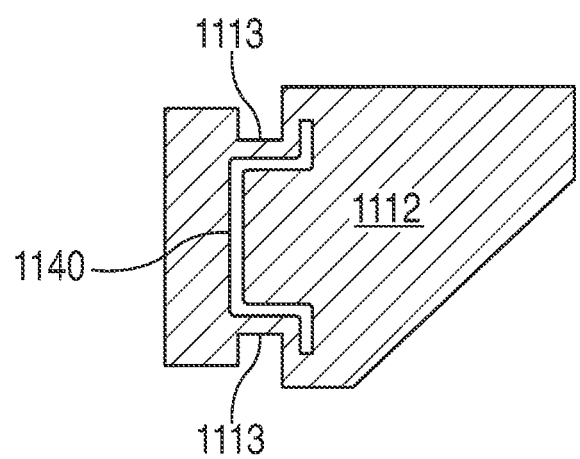

FIGS. 11A-B show the result after first shot component 1112 has been applied and cured. First shot component 1112 is shown abutting the inside surface of sections 1120 and 1130 as well as protruding through gap 1150. In addition, first shot component 1112 is shown encapsulating coupling structure 1140 (shown here as a bracket). Also shown as part of first shot component 1112 are second shot retaining regions 1113. Retaining regions 1113 may be formed by a metal insert, which is held in place during the molding process. After the mold cures, the metal inserts are removed, thereby leaving behind retaining regions 1113.

Figure 12A:
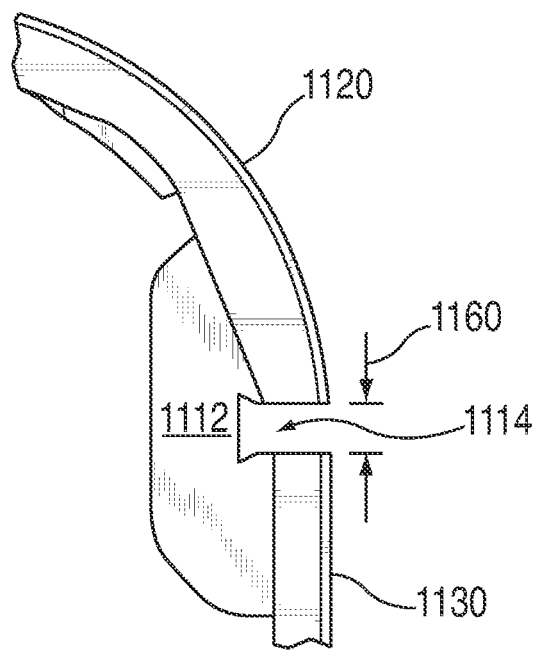
Figure 12B:
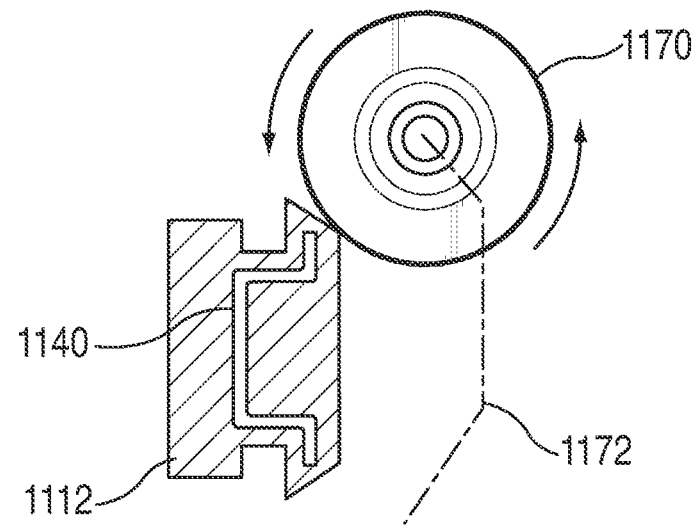

FIGS. 12A-B show cosmetic portion 1114 machined out of first shot component 1112. Formation of cosmetic portion 1114 also cut sections 1120 and 1130 to size so that gap 1160 of a predetermined distance exists therebetween. Gap 1160 may have a predetermined distance that is greater than the distance of gap 1150. FIG. 12B shows that cosmetic portion 1114 cut first shot component 1112 at an angle at its edges. FIG. 12B also illustrates how cutting tool 1170 machines away cosmetic portion 1114 by following path 1172. The angled cut provides a pocket into which material of the second shot component can flow into during molding of the second shot component.

Figure 13A:
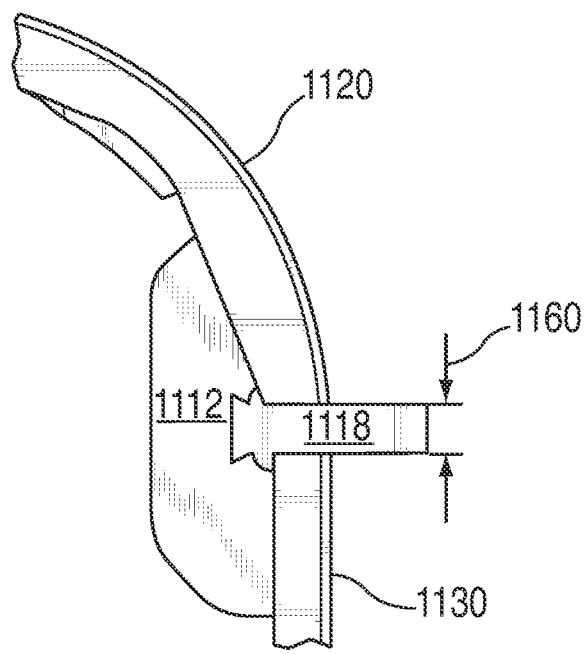
Figure 13B:
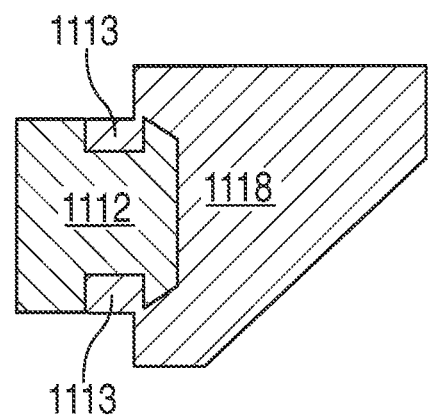
Figure 14A:
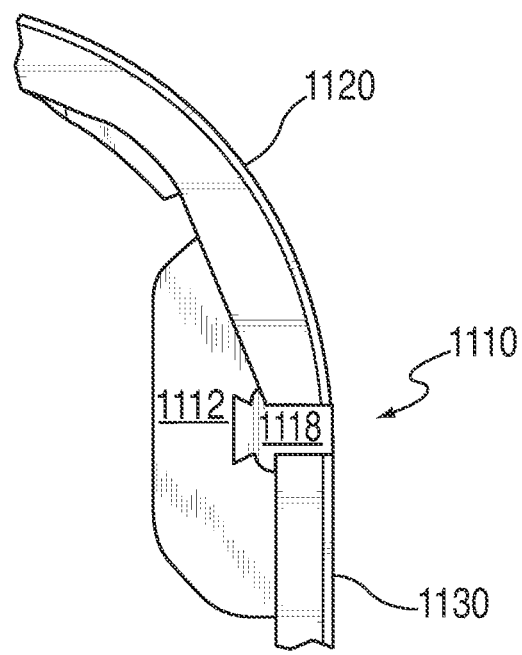
Figure 14B:
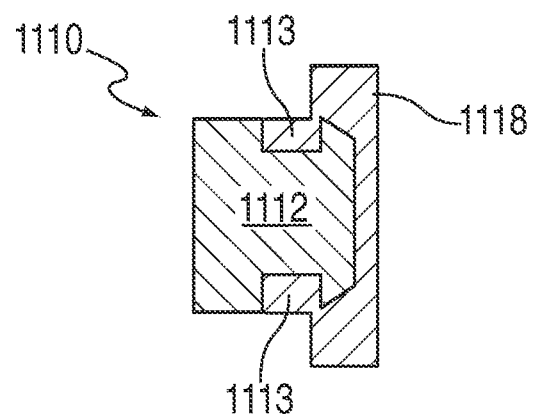

FIGS. 13A-B show how second shot component 1118 anchors itself to first shot component 1112 using second shot retaining regions 1113. FIGS. 13A-B also show second shot component 1118 extending through gap 1160. FIGS. 14A-B show knuckle 1110 after a finishing process has been applied to removed any excess second shot 1118.

Figure 15:
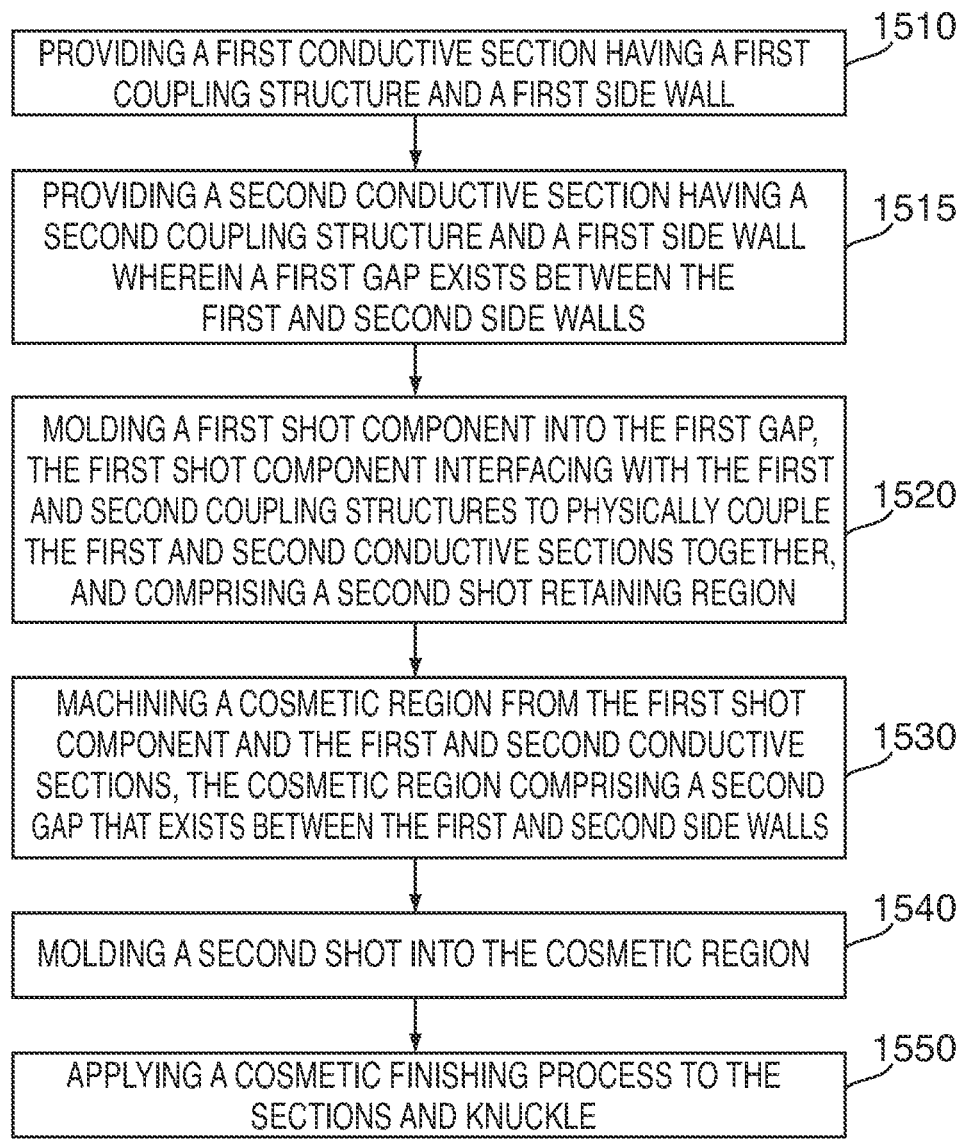
FIG. 15 shows an illustrative process for mechanically coupling two conductive sections together with a two-shot knuckle in accordance with some embodiments of the invention.

FIG. 15 shows an illustrative process for mechanically coupling two conductive sections together with a two-shot knuckle in accordance with an embodiment of the invention. Beginning at step 1510, a first conductive section having a first coupling structure and a first side wall is provided. At step 1515, a second conductive section having a second coupling structure and a second side wall is provided. The first and second sections are secured in place so that a first gap exists between the first and second side walls. The first coupling structure can be a bracket or an integrated structure. Likewise, the second coupling structure can be a bracket or an integrated structure.

At step 1520, a first shot component is molded into the first gap, the first shot component interfacing with the first and second coupling structures to physically couple the first and second conductive sections together, and comprising a second shot retaining region. The first shot component can be injection molded, for example.

At step 1530, a cosmetic region is machined out of the first shot component and the first and second conductive sections, the cosmetic region comprising a second gap that exists between the first and second side walls. Then, at step 1540, a second shot is molded into the cosmetic region.

At step 1550, a cosmetic finishing process is applied to the sections and knuckle. This process can involve trimming away a portion of the knuckle and polishing the sections to meet a desired aesthetic appeal.

It should be understood that the processes described above are merely illustrative. Any of the steps may be removed, modified, or combined, and any additional steps may be added or steps may be performed in different orders, without departing from the scope of the invention.

The described embodiments of the invention are presented for the purpose of illustration and not of limitation.

What is claimed is:

1. A portable electronic device, comprising:
   a first conductive section defining a first portion of an exterior surface of the portable electronic device and a first interior feature;
   a second conductive section defining a second portion of the exterior surface of the portable electronic device and a second interior feature; and
   an intermediate element that electrically isolates the first conductive section from the second conductive section, the intermediate element comprising:
      a first insulating material that at least partially encapsulates a portion of the first interior feature and a portion of the second interior feature to structurally couple the first and second conductive sections together; and
      a second insulating material that is coupled to the first insulating material and forms a third portion of the exterior surface of the portable electronic device.

2. The portable electronic device of claim 1, wherein:
   the first insulating material defines a protrusion; and
   the second insulating material is coupled to the first insulating material by at least partially encapsulating the protrusion.

3. The portable electronic device of claim 1, wherein:
   the first insulating material defines a retaining region having an interlocking feature; and
   the second insulating material is formed into the interlocking feature.

4. The portable electronic device of claim 3, wherein the interlocking feature is a pocket formed into the first insulating material.

5. The portable electronic device of claim 1, wherein the first insulating material has a first strength that is greater than a second strength of the second insulating material.

6. The portable electronic device of claim 1, wherein:
   the first interior feature comprises a first protrusion; and
   the portion of the second interior feature comprises a second protrusion.

7. The portable electronic device of claim 1, further comprising an antenna circuit electrically connected to the first conductive section.

8. The portable electronic device of claim 7, wherein the second conductive section is electrically isolated from the antenna circuit.

9. A phone, comprising:
   an antenna resonator defining a first portion of an exterior surface of the phone and a first interior feature;
   a metal housing section defining a second portion of the exterior surface of the phone and a second interior feature;
   a first non-conductive material that at least partially encapsulates a portion of the first interior feature and a portion of the second interior feature to structurally couple the antenna resonator and the metal housing section together; and
   a second non-conductive material that is coupled to the first non-conductive material and forms a third portion of the exterior surface of the phone; wherein:
   at least one of the first non-conductive material or the second non-conductive material electrically isolates the antenna resonator from the metal housing section.

10. The phone of claim 9, wherein the second non-conductive material separates the first non-conductive material from an external environment.

11. The phone of claim 9, wherein the first non-conductive material and the second non-conductive material are visually distinct.

12. The phone of claim 9, wherein the first non-conductive material comprises a glass-filled nylon and the second non-conductive material comprises an unfilled nylon material.

13. The phone of claim 9, wherein the first non-conductive material and the second non-conductive material both electrically isolate the antenna resonator from the metal housing section.

14. The phone of claim 9, wherein the second non-conductive material is formed from a material that is unable to chemically bond to the first non-conductive material.

15. A portable electronic device housing, comprising:
   a first metal housing portion defining a first portion of an exterior surface of the portable electronic device housing and a first interior feature;
   a second metal housing portion defining a second portion of the exterior surface of the portable electronic device housing and a second interior feature;
   a connector that electrically isolates the first metal housing portion from the second metal housing portion by at least partially surrounding the first interior feature and the second interior feature to structurally couple the first and second metal housing portions together, the connector forming a third portion of the exterior surface of the portable electronic device housing; and
   an antenna circuit electrically coupled to the first metal housing portion.

16. The portable electronic device housing of claim 15, wherein the connector includes a first component anchored to a second component.

17. The portable electronic device housing of claim 16, wherein the first component forms the third portion of the exterior surface of the portable electronic device housing.

18. The portable electronic device housing of claim 16, wherein the second component partially surrounds the first interior feature and the second interior feature.

19. The portable electronic device housing of claim 15, wherein the third portion is contiguous with the first portion and the second portion.

20. The portable electronic device housing of claim 15, wherein the connector comprises a first plastic and a second plastic.

* * * * *